United States Patent [19]
Keller

[11] Patent Number: 4,649,503
[45] Date of Patent: Mar. 10, 1987

[54] INSPECTION APPARATUS FOR INSPECTING ARTICLES MOVING ON A CONVEYOR

[75] Inventor: Rene Keller, Wettswil, Switzerland

[73] Assignee: Emhart Industries, Inc., Farmington, Conn.

[21] Appl. No.: 571,265

[22] Filed: Jan. 16, 1984

[30] Foreign Application Priority Data

Jan. 18, 1983 [GB] United Kingdom ................. 8301297

[51] Int. Cl.[4] ....................... G06F 15/20; G01N 21/16

[52] U.S. Cl. .................................... 364/552; 356/240; 364/473

[58] Field of Search ................ 364/469, 473, 500–552, 364/468, 560; 340/825.06; 356/237, 239, 240; 250/562, 223 B

[56] References Cited

U.S. PATENT DOCUMENTS

| | | | |
|---|---|---|---|
| 3,932,042 | 1/1976 | Faani et al. | 356/240 |
| 4,047,000 | 9/1977 | Bryant et al. | 364/468 |
| 4,140,901 | 2/1979 | Fischer et al. | 356/240 |
| 4,201,338 | 3/1980 | Keller | 356/240 X |
| 4,280,624 | 7/1981 | Ford | 356/240 X |
| 4,411,522 | 10/1983 | O'Connor et al. | 356/240 |
| 4,413,738 | 11/1983 | Pemberton et al. | 364/473 X |
| 4,431,436 | 2/1984 | Lulejian | 364/473 X |
| 4,476,533 | 10/1984 | Daudt et al. | 364/473 |

OTHER PUBLICATIONS

Advances in Laser Engineering, (1977), SPIE, vol. 122, "Automatic Cartridge Case Inspection & Process Control Monitor", W. J. Coleman et al, pp. 33–44.

Effective Utilization of Optics in Quality Assurance, (1977), SPIE, vol. 129, "Automatic Cartridge Case Inspection & Process Control Monitor", W. J. Coleman et al, pp. 74–87.

*Primary Examiner*—Errol A. Krass
*Assistant Examiner*—Kevin J. Teska
*Attorney, Agent, or Firm*—Arthur B. Moore; Arthur J. Samodovitz

[57] ABSTRACT

The inspection apparatus comprises scanning means and processing means operative to produce a lean signal which indicates how much an article moving on a conveyor leans from the vertical. Comparing means is operative to compare the lean signal with a first preselected standard and a second preselected standard which is lower than the first preselected standard. If the first standard is exceeded, the article is rejected by first rejecting means and, if the second standard is exceeded the article may be rejected by second rejecting means downstream of the first after further information has been obtained about the article from inspection devices, or the second standard may be used to provide an indication of a trend towards leaning.

4 Claims, 1 Drawing Figure

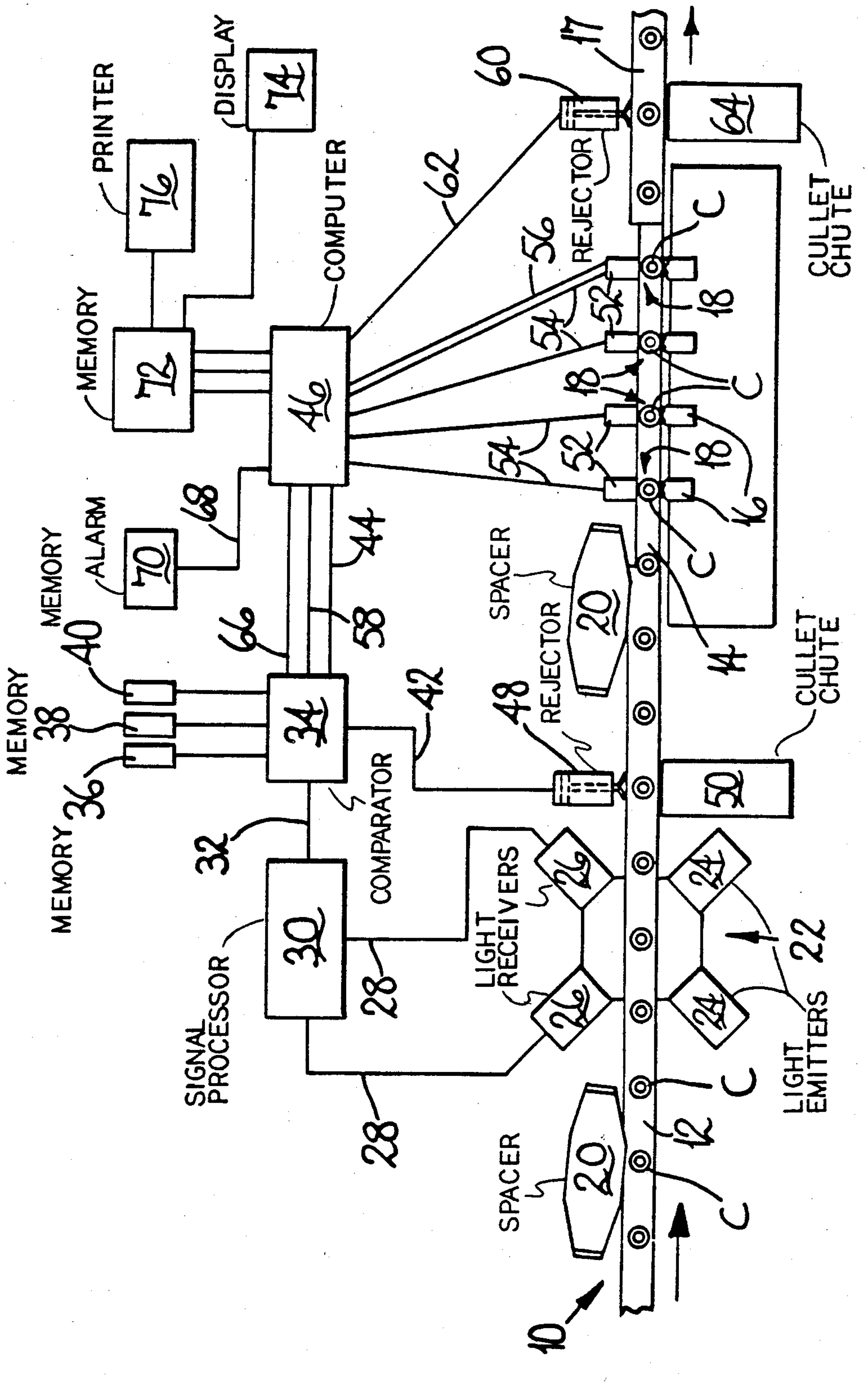
PRINTER
76
DISPLAY
74
MEMORY
72
COMPUTER
46
62
60
17
64
REJECTOR
56
54
52
18
C
CULLET CHUTE
MEMORY
ALARM
70
68
44
58
66
16
SPACER
20
14
MEMORY
40
38
36
34
42
48
REJECTOR
CULLET CHUTE
50
COMPARATOR
32
30
SIGNAL PROCESSOR
28
LIGHT RECEIVERS
26
24
22
LIGHT EMITTERS
12
10

INSPECTION APPARATUS FOR INSPECTING ARTICLES MOVING ON A CONVEYOR

BACKGROUND OF THE INVENTION

This invention is concerned with inspection apparatus for inspecting articles moving on a conveyor, the apparatus comprising scanning means operable to scan each article from two directions, which are substantially perpendicular to one another, as the article moves on the conveyor and to produce two output signals each of which is respectively proportional to the apparent amount by which the article leans from the vertical in the scanning direction, processing means operative to square the two output signals and to add the squares together thereby producing a lean signal indicating the true amount of lean from the vertical of the article, comparing means operative to compare the lean signal with a preselected standard and to provide a reject signal in the event that the lean signal exceeds the preselected standard, and rejecting means downstream of the scanning means operative on receipt of a reject signal from the comparing means to remove the article from the conveyor.

Glass containers which have just been manufactured are conventionally placed on a conveyor which carries them to inspection apparatus which inspects the containers to determine whether they are fit for their intended purpose. Such inspection apparatus may comprise, for example, lean detecting means for detecting whether the containers lean from the vertical by more than an acceptable amount, optical means for examining the containers optically, means for checking the neck opening size, and means for checking the containers for leaks. Such lean detecting means conventionally comprises scanning means operable to scan each container from two directions which are mutually perpendicular to one another as the container moves on the conveyor. From the output signals of the scanning means, processing means calculates a signal indicating the lean of the container, comparing means compares this signal with a standard preselected to indicate the maximum acceptable amount of lean, and rejecting means removes the container from the conveyor before it reaches the remainder of the inspecting apparatus if the standard is exceeded. Such scanning means and associated equipment is described in U.S. Pat. No. 3,754,123. The lean detecting means including the reject means is located upstream of the remainder of the inspecting apparatus so that the leaning containers cannot damage the remainder of the inspecting apparatus or jam it. The containers not rejected by the lean detecting means are brought to rest at various stations for inspection to take place. Second reject means is associated with the remainder of the inspecting apparatus and removes any containers which fail tests at the stations.

Inspection apparatus as mentioned above may comprise reading means for reading markings on the container which indicate in which mould the container was made since the output from many moulds is normally fed to the same inspection apparatus. In this case, it is possible to detect when containers from a particular mould fail particular tests and to take remedial action by changing the mould or moulding conditions. However, it is not possible to detect whether containers rejected by the lean detecting means would have failed any of the remaining tests. Furthermore, since the reading means is normally associated with the optical means and, therefore, is located downstream of the lean detecting means, the moulds in which the containers rejected by the lean detecting means were made are not recorded.

It is an object of the present invention to provide inspection apparatus in which increased information about leaning articles can be recorded.

BRIEF SUMMARY OF THE INVENTION

The invention provides inspection apparatus for inspecting articles moving on a conveyor, the apparatus comprising scanning means operable to scan each article from two directions, which are substantially perpendicular to one another, as the article moves on the conveyor and to produce two output signals each of which is respectively proportional to the apparent amount by which the article leans from the vertical in the scanning direction, processing means operative to square the two output signals and to add the squares together thereby producing a lean signal indicating the true amount of lean from the vertical of the article, comparing means operative to compare the lean signal with a preselected standard and to provide a reject signal in the event that the lean signal exceeds the preselected standard, and rejecting means downstream of the scanning means operative on receipt of a reject signal from the comparing means to remove the article from the conveyor, wherein the comparing means is operative, in addition to comparing the lean signal with the first-mentioned standard, to compare the lean signal with a second preselected standard, which is lower than the first preselected standard, and to provide an indicating signal in the event that the lean signal exceeds the second preselected standard.

In inspection apparatus in accordance with the last preceding paragraph, there are two standards of lean and the number of articles failing to pass each standard can be recorded. This enables further information about leaning articles to be recorded. For example, the indicating signal can be used to give warning of a trend towards leaning before the leaning becomes so bad that articles have to be rejected so that timely remedial action can be taken. Alternately, if the first standard is selected to indicate the maximum amount of lean which is permissible if damage or jamming is to be avoided and the second standard is selected to indicate the maximum amount of lean which is permissible if the articles are to be fit for their intended purpose, information can be obtained about whether articles falling between the standards fail any of the other tests in the inspection apparatus. This is done by providing second rejecting means, located downstream of the first-mentioned rejecting means, operative on receipt of a reject signal to remove an article from the conveyor, the provision of an indicating signal by the comparing means being effective to cause a reject signal to be received by the second rejecting means. Thus information can be obtained from inspection stations located between the two rejecting means. If the inspection apparatus comprises reading means operative to read markings on the article indicating in which mould the article was made information can be obtained about from which mould articles falling between the standards come.

Where two rejecting means are used, if the comparing means is also operative to compare the lean signal with a third preselected standard, which is lower than the second preselected standard, and to provide an indicating signal in the event that the third preselected standard is exceeded, this signal can be used as a warning that the articles are developing a lean and remedial action can be taken.

Advantageously, recording means records, for each article which exceeds a standard, in which mould the article was made so that manufacturing faults can be traced to a particular mould.

BRIEF DESCRIPTION OF THE DRAWING

There now follows a detailed description, to be read with reference to the accompanying drawing, of an inspection apparatus which is illustrative of the invention. It is to be understood that the illustrative inspection apparatus has been selected for description by way of example and not of limitation of the invention.

The drawing is a diagrammatic plan view of the illustrative inspection apparatus.

DETAILED DESCRIPTION OF PREFERRED EMBODIMENT OF THE INVENTION

The illustrative inspection apparatus is for inspecting articles, specifically glass containers C, moving on a conveyor 10. The conveyor 10 comprises a conveyor belt 12 which moves the containers C to a supporting surface 14 along which the containers C are moved by carriages 16 of the conveyor 10 which move around a path beside the supporting surface 14. From the supporting surface 14, the containers C pass to a further conveyor belt 17 of the conveyor 10. The carriages 16 collect the containers C from the conveyor belt 12 and slide them along the surface 14 to four inspection stations 18 at each of which each container is brought temporarily to rest for inspection. The conveyor 10 also comprises two spacers 20 which operate to space the containers C one from another.

The illustrative inspection apparatus comprises scanning means 22 located downstream of the first spacer 20 and operative to scan each container C from two directions which are substantially perpendicular to one another at 45° and 135° to the direction of motion of the containers C. The scanning means 22 scans the containers C as they move on the conveyor belt 12. The scanning means 22 comprises two light-beam emitters 24 and two light-beam receivers 26 arranged to receive beams from the emitters 24. The scanning means 22 produces two output signals on lines 28. The output signals are each respectively proportional to the apparent amount by which the container C being scanned leans from the vertical in the scanning direction between the emitter 24 and the receiver 26. A fuller explanation of the principle of operation and the construction of the scanning means 22 is contained in the aforementioned U.K. Patent Specification No. 1383962.

The illustrative inspection apparatus also comprises processing means 30 which is also fully described in U.K. Patent Specification No. 1383962. The processing means 30 receives the signals on the lines 28 from the scanning means 22 and is operative to square the two output signals and to add the squares together thereby producing a lean signal on a line 32 indicating the true amount of lean from the vertical of the container C.

The illustrative inspection apparatus also comprises comparing means 34 operative to compare the lean signal with a first preselected standard supplied from a store 36, with a second preselected standard supplied from a store 38, and with a third preselected standard supplied from a store 40. The first preselected standard is selected to indicate the maximum amount of lean which is permissible if damage to the inspection apparatus or jamming thereof is to be avoided. Accordingly, the first preselected standard is set equal to the square of the maximum permissible lean. The second preselected standard is selected to indicate the maximum amount of lean which is permissible if the container C is to be fit for its intended purpose. Accordingly, the second preselected standard is set equal to the square of the maximum permissible lean and is lower than the first preselected standard. The third preselected standard is lower than the second preselected standard.

In the event that the lean signal exceeds the first preselected standard, the comparing means 34 sends a reject signal on a line 42 and a signal on a line 44 to a computer 46 of the illustrative inspection apparatus. The line 42 leads to first rejecting means 48 of the illustrative inspection apparatus. The rejecting means 48 is beside the conveyor belt 12 downstream of the scanning means 48 and is operative on receipt of a reject signal on the line 42 to remove the container C from the conveyor belt 12 by extending a plunger across the conveyor belt 12 to deflect the container C into a cullet chute 50.

The illustrative inspection apparatus also comprises inspection devices 52 located at the inspection stations 18. These devices 52 are protected from damage and jamming due to excessively leaning containers C by the operation of the first rejecting means 48. The devices 52 are connected by lines 54 to the computer 46 and send it a signal whenever a container C fails the test applied by that device 52. The device 52 furthest downstream also incorporates reading means operative to read markings on the containers C which indicate in which mould a container was made and to signal the markings to the computer 46 on a line 56. U.K. Patent Specification No. 1580735 describes such reading means.

If a container C has a lean which does not exceed the first preselected standard, it passes to the stations 18 for further inspection. However, the comparing means 34, as mentioned above, is also operative to compare the lean signal with the second preselected standard and, in the event that the lean signal exceeds the second preselected standard, to provide an indicating signal on a line 58 to the computer 46.

The illustrative inspection apparatus also comprises second rejecting means 60 located downstream of the inspection stations 18 and the first rejecting means 48. On receipt of a reject signal on a line 62 from the computer 46 which, after a suitable time interval, passes a reject signal to the line 62 when it receives an indicating signal on the line 58, the rejecting means 60 is operative to remove the container C from the conveyor 10. The rejecting means 60 does this by extending a plunger across the conveyor belt 17 to deflect the container C into a cullet chute 64. The computer 46 also sends a reject signal to the second rejecting means 60 on the line 62 if a container C fails any of the tests applied by the devices 52.

If the lean of a container C does not exceed the second standard, the container C is not rejected unless it fails any of the tests applied by the devices 52. However, if its lean exceeds the third preselected standard, the comparing means 34 sends an indicating signal on a line 66 to the computer 46.

The computer 46 correlates the information it receives on the lines 44, 54, 58 and 66. As far as containers C whose lean exceeds the first preselected standard are concerned, the computer 46 can only record the number rejected for this reason. However, as far as the containers C whose lean exceeds the second but not the first preselected standard are concerned, the computer 46 can record the mould from which they come and also whether they fail any of the tests applied by the devices 52. As far as containers C whose lean exceeds the third preselected standard but not the first or the second preselected standard are concerned, the computer 46 produces a warning signal on a line 68 to a warning device 70 so that a warning of a tendency towards leaning is supplied. The warning signal includes identification of the mould from which the container C has come. The computer 46, thus, provides recording means operative to record each instance of the lean signal exceeding any of the first, second, or third standards and, for each article exceeding the second or the third preselected standard, to record in which mould it was made and which standard was exceeded.

The computer 46 is connected to a store 72 in which the information recorded is stored. The store 72 is connected to a visual display unit 74 and a print-out unit 76.

The illustrative inspection apparatus records increased information about leaning containers C since information is recorded about containers which would be rejected in conventional apparatus without passing to the devices 52 and, in particular, without the mould in which they were made being detected.

What is claimed is:

1. In a container inspection system including a conveyor means for sequentially transporting a plurality of containers, each of said containers being formed in one of a plurality of molds and having a code indicating the mold in which it was formed, code reading means located along the path of said conveyor means for reading said codes on said containers, and inspection apparatus located along the path of said conveyor means for inspecting said containers to determine a characteristic other than lean of said containers, the improvement comprising:

lean detection means located along the path of said conveyor means upstream of said inspection apparatus and said code reading means for measuring the amounts of lean exhibited by the containers being transported by said conveyor means, means for comparing the amounts of lean measured by said lean detection means to first and second standards and generating a first reject signal when the amount of lean exceeds said first standard and a second reject signal when the amount of lean exceeds said second standard, said first standard representing a greater amount of lean than said second standard and containers exhibiting said greater amount of lean posing a substantial threat of jamming said inspection apparatus while containers exhibiting lesser amounts of lean posing relatively little threat of jamming said inspection apparatus but being unacceptable for their intended purpose, means operatively coupled to said code reading means and the comparing means for recording the code of the mold which produced each container exhibiting said lesser amount of lean, first reject means located adjacent to said conveyor means downstream of said lean detection means and upstream of said inspection apparatus and said code reader means for rejecting containers from said conveyor means in response to said first reject signals so that containers exhibiting said greater amount of lean are rejected before reaching said inspection apparatus and containers exhibiting said lesser amounts of lean pass by said first reject means to said inspection apparatus and code reading means, and second reject means located adjacent to said conveyor means downstream of said inspection apparatus and said code reading means and responsive to said second reject signals for rejecting the containers exhibiting said lesser amounts of lean after said code reading means reads their codes.

2. An improvement to a container inspection system as set forth in claim 1, wherein said means for comparing includes means for comparing the amount of lean measured by said lean detection means to a third standard representing a lesser amount of lean than said second standard and generating a warning signal when the amount of lean exceeds said third standard but is less than said second standard, and the recording means records the code of the mold which produced each container exhibiting an amount of lean between said second and said third standards to indicate that the respective mold is going bad.

3. An improvement to a container inspection system as set forth in claim 1, wherein said lean detection means comprises means for scanning each container from two mutually perpendicular directions to yield two output signals each of which output signals being proportional to an apparent amount by which the container leans from the vertical direction perpendicular to the respective scanning direction, squaring said two output signals and adding the squares together to produce a lean signal indicating the true amount of lean of the container.

4. In a container inspection system including a conveyor means for sequentially transporting a plurality of containers, each of said containers being formed in one of a plurality of molds and having a code indicating the mold in which it was formed, and code reading means located along the path of said conveyor means for reading said codes on said containers, the improvement comprising:

lean detection means located along the path of said conveyor means upstream of said code reading means for measuring the amounts of lean exhibited by the containers being transported by said conveyor means, means for comparing the amounts of lean measured by said lean detection means to first and second standards and generating a first reject signal when the amount of lean exceeds said first standard and a second reject signal when the amount of lean exceeds said second standard, said first standard representing a greater amount of lean than said second standard and containers exhibiting said greater amount of lean posing a substantial threat of jamming said code reading means while containers exhibiting lesser amounts of lean posing relatively little threat of jamming said code reading means but being unacceptable for their intended purpose, means operatively coupled to said code reading means and the comparing means for recording the code of the mold which produced each container exhibiting said lesser amount of lean, first reject means located adjacent to said conveyor means downstream of said lean detection means and upstream of said code reading means for rejecting containers from said conveyor means in response to said first reject signals so that containers exhibiting said greater amount of lean are rejected before reaching said code reading means and containers exhibiting said lesser amounts of lean pass by said first reject means to said code reading means, and second reject means located adjacent to said conveyor means downstream of said code reading means and responsive to said second reject signals for rejecting the containers exhibiting said lesser amounts of lean after said code reading means reads their codes.

* * * * *